United States Patent [19]

Georges

[11] Patent Number: 5,086,141

[45] Date of Patent: Feb. 4, 1992

[54] POLYSILOXANE CROSSLINKED STYRENE/BUTADIENE COPOLYMERS

[75] Inventor: Michael K. Georges, Guelph, Canada

[73] Assignee: Xerox Corporation, Stamford, Conn.

[21] Appl. No.: 516,571

[22] Filed: Apr. 30, 1990

Related U.S. Application Data

[62] Division of Ser. No. 325,715, Mar. 20, 1989, Pat. No. 4,954,408.

[51] Int. Cl.$^5$ .................................. C08F 30/08
[52] U.S. Cl. ...................... 526/279; 525/105; 525/479; 528/25
[58] Field of Search .............. 525/479, 105; 526/279; 528/25

[56] References Cited

U.S. PATENT DOCUMENTS

| | | |
|---|---|---|
| 3,526,533 | 9/1970 | Jacknow et al. .............. 430/108 |
| 3,691,257 | 9/1972 | Kendrick et al. .............. 525/479 |
| 3,929,850 | 12/1975 | Streck et al. .............. 526/279 |
| 4,139,519 | 2/1979 | Itoh et al. .............. 526/279 |
| 4,340,660 | 7/1982 | Kiuchi et al. .............. 430/109 |
| 4,770,968 | 9/1988 | Georges .............. 430/108 |

FOREIGN PATENT DOCUMENTS 59-210916 11/1984 Japan .
61-106614 5/1986 Japan .

*Primary Examiner*—Melvyn I. Marquis
*Assistant Examiner*—R. Dean, Jr.
*Attorney, Agent, or Firm*—E. O. Palazzo

[57] ABSTRACT

A crosslinked polysiloxane styrene/butadiene copolymer represented by the formula of FIG. 1 wherein m is a number of from about 2 to about 10; n is a number of from about 10 to about 1,000; k, l, o, p, q, r, s, t, u are weight fraction numbers totaling one with the sum of k+p+r+t being from about 0.35 to about 0.94; the sum of l+q+s+u being from about 0.05 to about 0.2 and o is from about 0.02 to about 0.5; R is CH$_1$CH(R'), or alkylene - CR" C(O)O, where R' is an aromatic or substituted aromatic substituent and R" is hydrogen or an alkyl substituent.

11 Claims, 7 Drawing Sheets

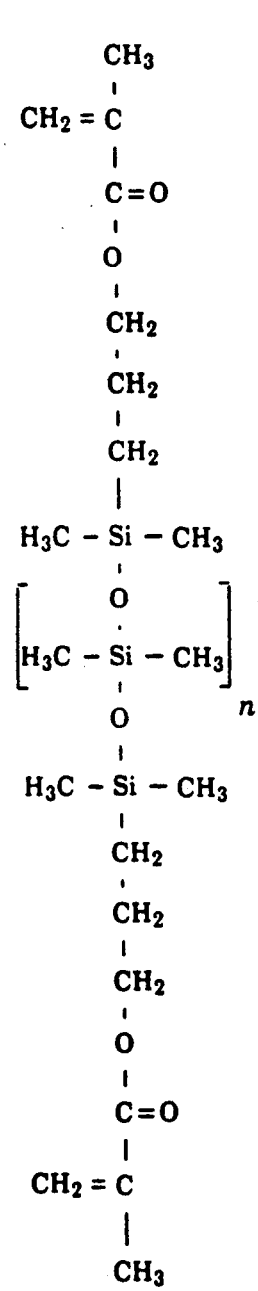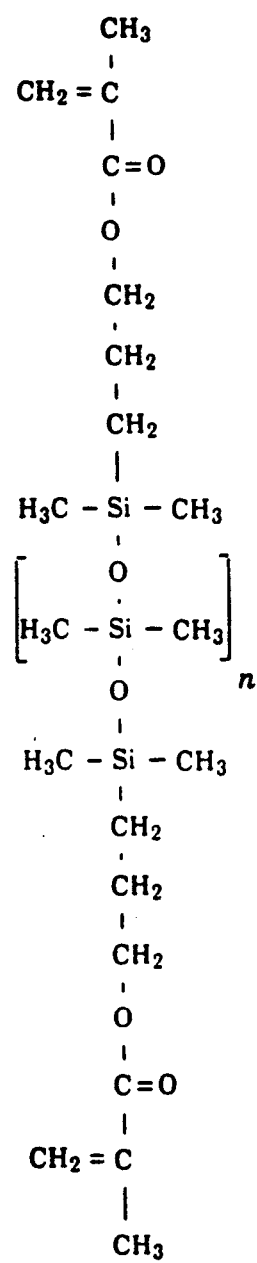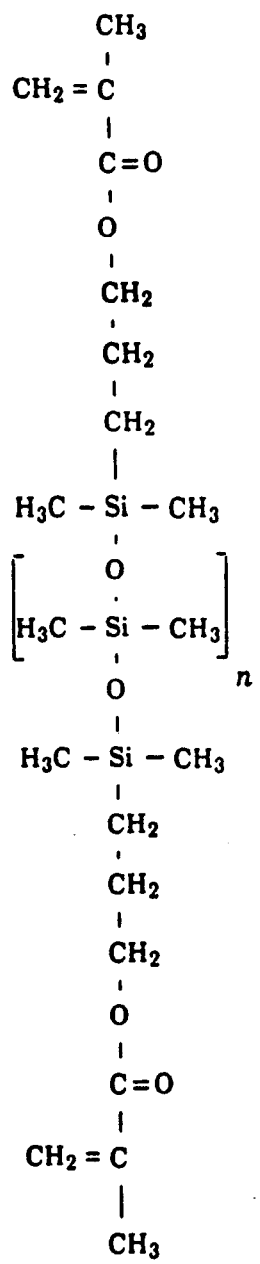
FIG. 2A
(n = 62)
FIG. 2B
(n = 154)
FIG. 2C
(n = 200)

SCHEME 1

SCHEME 2

SCHEME 3

POLYSILOXANE CROSSLINKED STYRENE/BUTADIENE COPOLYMERS

This is a division of application Ser. No. 325,715, filed Mar. 20, 1989, now U.S. Pat. No. 4,954,408.

BACKGROUND OF THE INVENTION

This invention is generally directed to resin compositions useful for incorporation into toner and developer compositions. More specifically, the present invention relates to polysiloxane resins, especially polydialkylsiloxanes crosslinked styrene/butadiene and polydiarylsiloxanes crosslinked styrene/butadiene copolymers useful for the formulation of toner compositions that can be selected for imaging processes wherein silicone release oils are avoided or such oils are contained in the toner composition. In one embodiment, there are provided in accordance with the present invention polydialkylsiloxanes or polydiarylsiloxanes crosslinked styrene/butadiene copolymers resins that can be selected for the formulation of toner compositions containing pigment particles, and optional additive particles. In addition, the present invention is directed to rapid processes for the preparation of the aforementioned resins by suspension free radical polymerization processes and wherein products of high purity and high yields are obtained. Processes for the preparation of the aforementioned copolymers using free radical procedures can be accomplished generally by the emulsion polymerization techniques as illustrated in U.S. Pat. No. 4,469,770; and the suspension polymerization processes as illustrated in U.S. Pat. No. 4,558,108, the disclosures of each of these patents being totally incorporated herein by reference, providing that the appropriate reactants are selected and there results the copolymers of the present invention. The toner and developer compositions formulated with the polysiloxane resins illustrated herein are particularly useful in electrophotographic imaging methods with soft roll fusers, and wherein release agents, such as silicone oils, selected to prevent toner particles from adhering to the surface of the fuser are not needed, or are incorporated into the polysiloxane crosslinked resins illustrated herein. Furthermore, the aforementioned copolymers contain polysiloxane blocks that also function as crosslinks between the styrene and the butadiene. While it is known that divinylbenzene crosslinks may increase the durability and elasticity of resins, the polysiloxanes of the present invention, in addition to possessing the aforementioned functions, enhance toner release, that is since they are present as crosslinks or are functioning as crosslinking agents between styrene/butadiene copolymer chains, they enhance toner release by increasing the elasticity and durability of the resin.

There were located as a result of a patentability search (1) U.S. Pat. No. 4,340,660, which discloses toners with crosslinked vinyl polymers having a gel content of 50 to 99 percent and a crosslinked polymer having a gel content of 10 to 0 percent, reference for example the Abstract of the Disclosure; also note column 5 of this patent wherein a mixture of a styrene butadiene copolymer with a polysiloxane is disclosed; (2) U.S. Pat. No. 3,526,533, wherein carriers with, for example, copolymeric carrier coatings are disclosed and wherein the silicon prepolymers include those with ethylenic or acetylenic linkages, reference columns 4 and 5; (3) Japanese Patent Publication Abstract 62-108262, which discloses a toner formed with an acryloxy silane and styrene; and (4) as background interest U.S. Pat. Nos. 3,053,688; 3,054,751; 3,215,527; 4,039,331; 4,142,982 and 4,430,408. With further respect to U.S. Pat. No. 3,526,533, the terpolymer carrier coating materials are comprised of polymers that are random, block or graft (which are essentially branched polymers) copolymers. There is, however, no teaching in this patent of crosslinked materials, especially polysiloxane crosslinked materials, wherein the polysiloxane portion is not a block or a graft (branch) but instead is the crosslinking function joining two styrene/butadiene copolymers together. Also, the prepolymer polysiloxanes of this patent have only one free radical reactive function per chain (or a functionality of 2). In contrast, for example, with the polysiloxanes of the present invention two free radical functions on each chain are selected (or a functionality of 4), one on each end.

Also, toner and developer compositions, especially those containing charge enhancing additives, are well known, reference for example U.S. Pat. Nos. 3,893,935; 3,944,493; 4,007,293; 4,079,014 and 4,394,430. Thus, for example, there is described in U.S. Pat. No. 3,893,935 the use of certain quaternary ammonium salts as charge control agents for electrostatic toner compositions. Further, there are illustrated in U.S. Pat. No. 4,338,390, the disclosure of which is totally incorporated herein by reference, developer and toner compositions having incorporated therein as charge enhancing additives organic sulfate and sulfonate substances. A similar teaching is present in U.S. Pat. No. 4,394,430, the disclosure of which is totally incorporated herein by reference. Moreover, there are disclosed in U.S. Pat. No. 4,298,672, the disclosure of which is totally incorporated herein by reference, positively charged toner compositions with resin particles, and pigment particles; and as a charge enhancing additive, alkyl pyridinium compounds, inclusive of cetyl pyridinium chloride.

Additionally, toner and developer compositions useful in xerographic imaging processes wherein silicone oils are not needed are known, reference for example U.S. Pat. No. 4,556,624, the disclosure of which is totally incorporated herein by reference. In this patent, there are disclosed, for example, improved positively charged toner compositions comprised of a polyblend mixture of crosslinked copolymer compositions, a second polymer, pigment particles, and a particular wax component thereby enabling the toner compositions to be selected for imaging systems wherein release fluids are not required. The types of resin described in this patent and other patents relating to toner compositions, including those compositions useful in imaging methods wherein release fluids are avoided, include polyamides, epoxies, diolefins, polyurethanes, vinyl resins and polymeric esterification products of a dicarboxylic acid, and a diol comprising a diphenol. Typical monomers selected for the preparation of the appropriate aforementioned resins include styrene, p-chlorostyrene, unsaturated mono-olefins such as ethylene, propylene, butylene, isobutylene and the like; vinyl esters such as esters of monocarboxylic acids including methyl acrylate, ethyl acrylate, n-butyl acrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and other similar acrylates; acrylonitrile, methacrylonitrile, and acrylimide; vinyl ethers such as vinyl methyl ether, vinyl isobutyl ether, vinyl ethyl ether, and the like; vinyl ketones such as vinyl methyl ketone, vinyl hexyl ketone, and methyl isopropenyl ketone, and N-vinyl indole, N-vinyl pyrrolidene, and the like; styrene butadiene copolymers; and mixtures thereof.

As preferred toner resins illustrated in the '624 patent, there can be selected styrene polymers, and the esterification products of a dicarboxylic acid, and a diol comprising a diphenol. The aforementioned polyesters are illustrated in U.S. Pat. No. 3,590,000, the disclosure of which is totally incorporated herein by reference. Other specific preferred toner resins include styrene/methacrylate copolymers; styrene/butadiene copolymers; polyester resins obtained from the reaction of bisphenol A and propylene oxide, followed by the reaction of the resulting product with fumaric acid; branched polyester resins resulting from the reaction of dimethyl terephthalate, 1,3-butanediol, 1,2-propanediol, and pentaerythritol; styrene/butadiene copolymers prepared by a suspension polymerization process, reference U.S. Pat. No. 4,558,108, the disclosure of which is totally incorporated herein by reference; styrene/butadiene resins prepared by an emulsion polymerization process, reference U.S. Pat. No. 4,469,770, the disclosure of which is totally incorporated herein by reference; and Pliolites.

Furthermore, illustrated in U.S. Pat. No. 3,418,354 are processes for obtaining olefin-polyoxyalkylene copolymers by a graft reaction with a peroxide, whereby there are generated free radical sites on the backbone polymer. One process embodiment disclosed in the '354 patent involves the addition of an alpha olefin, such as styrene, and a peroxide to a polyoxyalkylene compound, such as a siloxane, wherein there results a graft copolymer; and more specifically, an olefin-polyoxyalkylene graft copolymer, see column 2, line 23. In Japanese Patent Publication 46-9355, there is disclosed a process for the preparation of graft block copolymers with a polysiloxane chain by the reaction of a functional polysiloxane with a polymer obtained from the anion polymerization of a styrene or a butadiene. Japanese Patent Publication 58-225103 discloses a method for the crosslinking of a thermoplastic resin by the reaction of a hydrogenated styrene-butadiene-styrene block copolymer with a silane in the presence of organic peroxides. Further, in U.S. Pat. No. 3,691,257 there are disclosed organic polymers modified by incorporating therein a siloxane polymer organic block copolymer; while Japanese Patent Publication 57-187345 describes a rubber modified styrene resin prepared by continuous bulk polymerizations in the presence of organic polysiloxanes and 1,2-vinyl polymers.

In U.S. Pat. No. 4,770,968, the disclosure of which is totally incorporated herein by reference, there are illustrated toner and developer compositions with branched polysiloxane styrene/butadiene terpolymers of the formula, for example, as recited in Claim 1. These branched copolymers differ from the copolymers of the present invention in that, for example, each polysiloxane unit is part of only a single styrene/butadiene copolymer as compared to the present copolymers in which each siloxane unit is attached to two styrene/butadiene copolymers. Accordingly, with the polymers of the present invention the topology is markedly different as these polymers possess, for example, a structure in which two styrene/butadiene copolymers are joined by a polysiloxane crosslink. In addition, physical properties associated with flow, such as melt index, are different with the resins of the present invention which possess less flow for a given size siloxane incorporated in a given amount (for example, 10 percent incorporation of a 5,000 molecular weight polydimethylsiloxane provides a melt index of 12 grams/10 minute for a resin of the present invention but provides a melt index of 9.3 grams/10 minute for a corresponding branched polydimethylsiloxane resin).

Furthermore, there are illustrated in U.S. Pat. No. 4,894,309, the disclosure of which is totally incorporated herein by reference, processes for the preparation of crosslinked polymers wherein, for example, divinylbenzene is selected as the crosslinking component. More specifically, the patent discloses a free radical suspension polymerization process for obtaining crosslinked styrene butadiene ternary copolymers, which comprises the polymerization of styrene monomers, butadiene monomers, and crosslinking components in the presence of a surfactant, a stabilizer, and a first and second initiator; and wherein the aforementioned components are present in an aqueous phase; heating the resulting aqueous mixture at a temperature of from about 50° C. to about 110° C.; thereafter heating the mixture at a temperature of from about 110° C. to about 150° C.; followed by cooling; and isolating the desired product.

There is a need for new toner resins that possess desirable characteristics, and that are useful in electrophotographic imaging systems wherein, for example, release oils are avoided. Additionally, there is a need for simple economical processes that enable the preparation of crosslinked polysiloxane resins in high yields exceeding 80 percent, for example, and wherein the resulting products are of an acceptable purity exceeding in some instances 90 percent. There is also a need for novel toner resins which are useful as toner compositions when selected for the development of images, and wherein fixing is accomplished without the need for release fluids. In addition, there is a need for crosslinked resins useful for the formulation of toner compositions that possess desirable mechanical properties, excellent fusing characteristics, and acceptable release properties. Moreover, there is a need for developer compositions containing toner components, including the crosslinked polysiloxanes illustrated herein, and carrier components. There is also a need for imaging and printing methods wherein there are selected toner and developer compositions containing therein the crosslinked polysiloxanes disclosed herein, and wherein release fluids, such as silicone oils, are avoided during the fusing process. Moreover, there remains a need for improved toner compositions that are compatible with fusing rolls incorporated into imaging apparatuses, especially Viton fuser rolls. One main advantage of the polysiloxane crosslinked resins of the present invention is that they combine the properties of good release with increased elasticity and durability. This is usually not the situation with the prior art branched polysiloxanes, wherein a second resin, divinylbenzene crosslinked styrene/butadiene, is added to the toner formulation to increase elasticity and durability. Additionally, the aforementioned prior art materials can be regarded as block copolymers where the styrene/butadiene is one block and the polysiloxane a second block as contrasted to the present invention wherein, for example, the polysiloxane is a crosslinking agent joining at least two (or more) styrene/butadiene polymers.

With further respect to the invention of the present application, particularly the developer compositions thereof, one Viton soft fuser roll selected for use in electrophotographic copying machines is comprised of a soft roll fabricated from lead oxide and DuPont Viton E-430 resin, a vinylidene fluoride hexafluoropropylene copolymer. This roll contains approximately 15 parts of lead oxide and 100 parts of Viton E-430, which mixture is blended and cured on the roll substrate at elevated temperatures. Apparently, the function of the lead oxide is to control the generation of unsaturation by dehydrofluorination which can cause crosslinking, and to provide release mechanisms for the toner composition.

DESCRIPTION OF THE DRAWINGS

FIGS. 2A, 2B and 2C represents macromers that may be selected for the preparation of certain crosslinked polysiloxanes of the present invention.

SUMMARY OF THE INVENTION

It is an object of the present invention to provide polymers containing polysiloxane crosslinks.

In another object of the present invention there are provided toner compositions with certain copolymer resins containing polysiloxane crosslinks incorporated therein.

In still a further object of the present invention there are provided economical processes for the preparation of copolymer and copolymer resins containing polysiloxane crosslinks.

Further, in another object of the present invention there are provided polydialkylsiloxane, polydiarylsiloxane, or mixtures thereof crosslinked styrene/butadiene ternary copolymer resins useful for incorporation into toner compositions that possess excellent fusing and release characteristics, and wherein the toners involved can be selected for imaging processes without the utilization of release fluids, or wherein such fluids are incorporated into the toner composition.

In a further object of the present invention there are provided specific toner compositions and processes which are compatible with Viton fuser rolls.

Another object of the present invention resides in the preparation of crosslinked polysiloxane styrene/butadiene resins and methods of imaging and printing with toners containing such resins.

These and other objects of the present invention are accomplished by providing toner resin compositions. More specifically, there are provided in accordance with the present invention polysiloxanes, especially polydialkylsiloxane crosslinked styrene/butadiene copolymer compositions useful as toner resins. Accordingly, the present invention is directed to, in one important embodiment, polysiloxane crosslinked styrene/butadiene copolymers inclusive specifically of crosslinked (1) polydimethylsiloxane styrene/methacrylates, (2) polydimethylsiloxane methacrylate acrylates, (3) polydimethylsiloxane styrene/acrylonitriles, (4) polydimethylsiloxane acrylonitrile/vinylacetates, (5) polydimethylsiloxane polyvinyl dichlorides, (6) polydimethylsiloxane polystyrenes, (7) polydiphenylsiloxanes, and the like.

Figure 1:
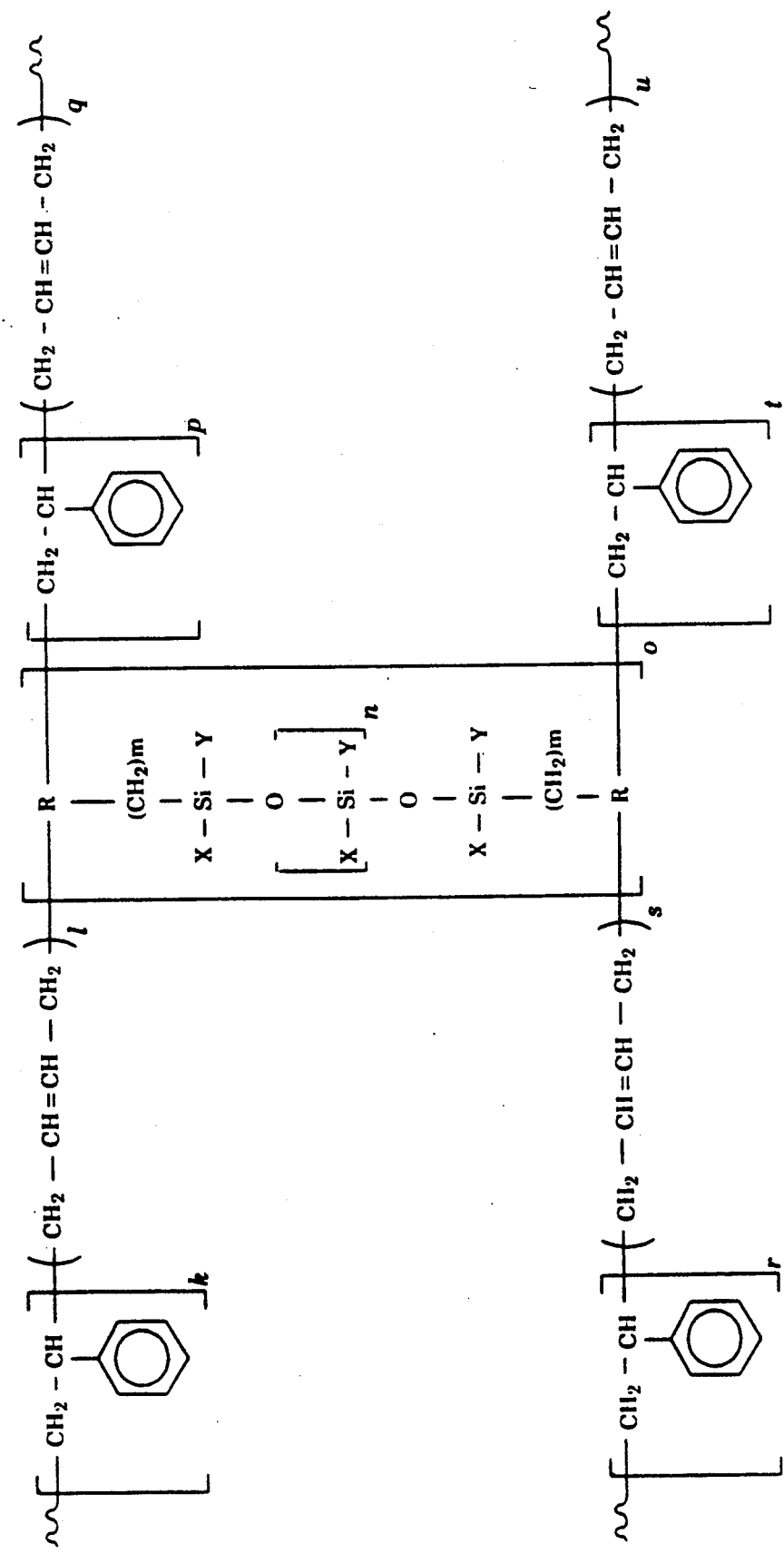
FIGS. 1, 3, 4 and 5 represent formulas of the polysiloxane crosslinked polymers of the present invention.

One embodiment of the present invention is directed to toner compositions containing polydialkylsiloxane crosslinked styrene/butadiene copolymers of the formula of FIG. 1, wherein k, l, o, p, q, r, s, t and u are weight fraction numbers totaling 1 (one) with the sum of $k+p+r+t$ being from about 0.35 to about 0.95; the sum of $l+q+s+u$ is from about 0.05 to about 0.20; and o is from about 0.02 to about 0.5; m is a number of from about 2 to about 10; n is a number of from about 10 to about 1,000; R is $CH_2CH(R')$, alkyl-CR" C(O)O and alkylene-CR"C(O)O; where R' is an aromatic (aryl) or substituted aromatic substituent and R" is hydrogen or an alkyl substituent, and wherein the aforementioned alkyl substituents contain, for example, from about 1 to about 20 carbon atoms such as methyl, ethyl, propyl, butyl, pentyl, hexyl, heptyl, octyl, nonyl, decyl, and the like; X is aryl, substituted aryl, or alkyl; and Y is aryl, substituted aryl, or alkyl. Aryl or aromatic includes those substituents with from about 6 to about 24 carbon atoms such as phenyl, naphthyl, and the like, which substituents may be substituted with halogen, alkyl, and the like. The aforementioned compositions are generally of a weight average molecular weight of from about 90,000 to about 300,000, and a number average molecular weight of from about 12,000 to about 17,000, which molecular weights were determined by GPC (gel permeation chromatography) analysis with polystyrene as standards and tetrahydrofuran as the elutant. Also, the polysiloxane encompassed by the present invention, reference FIG. 1, for example, are characterized by 80 MHz $^1$H NMR, an excellent melt index, for example, from about 5 to 25 grams/10 minutes, and glass transition temperatures from about 45° C. to about 60° C.

Furthermore, the polysiloxane phase, that is the segment or crosslink with o being from about 0.02 to about 0.5, has a melting point temperature of from about −500° to about −20° C.

Figure 3:
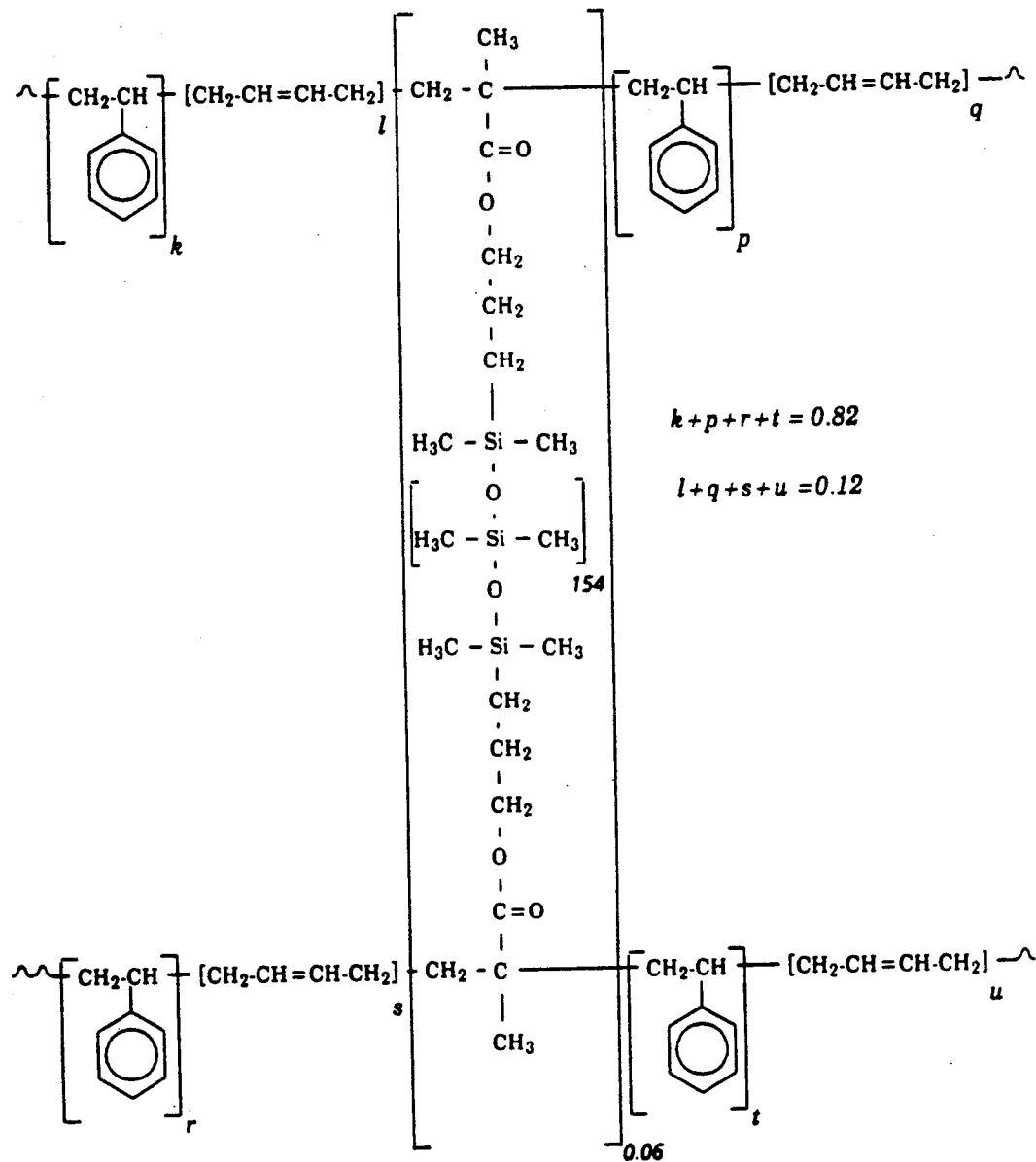
Figure 4:
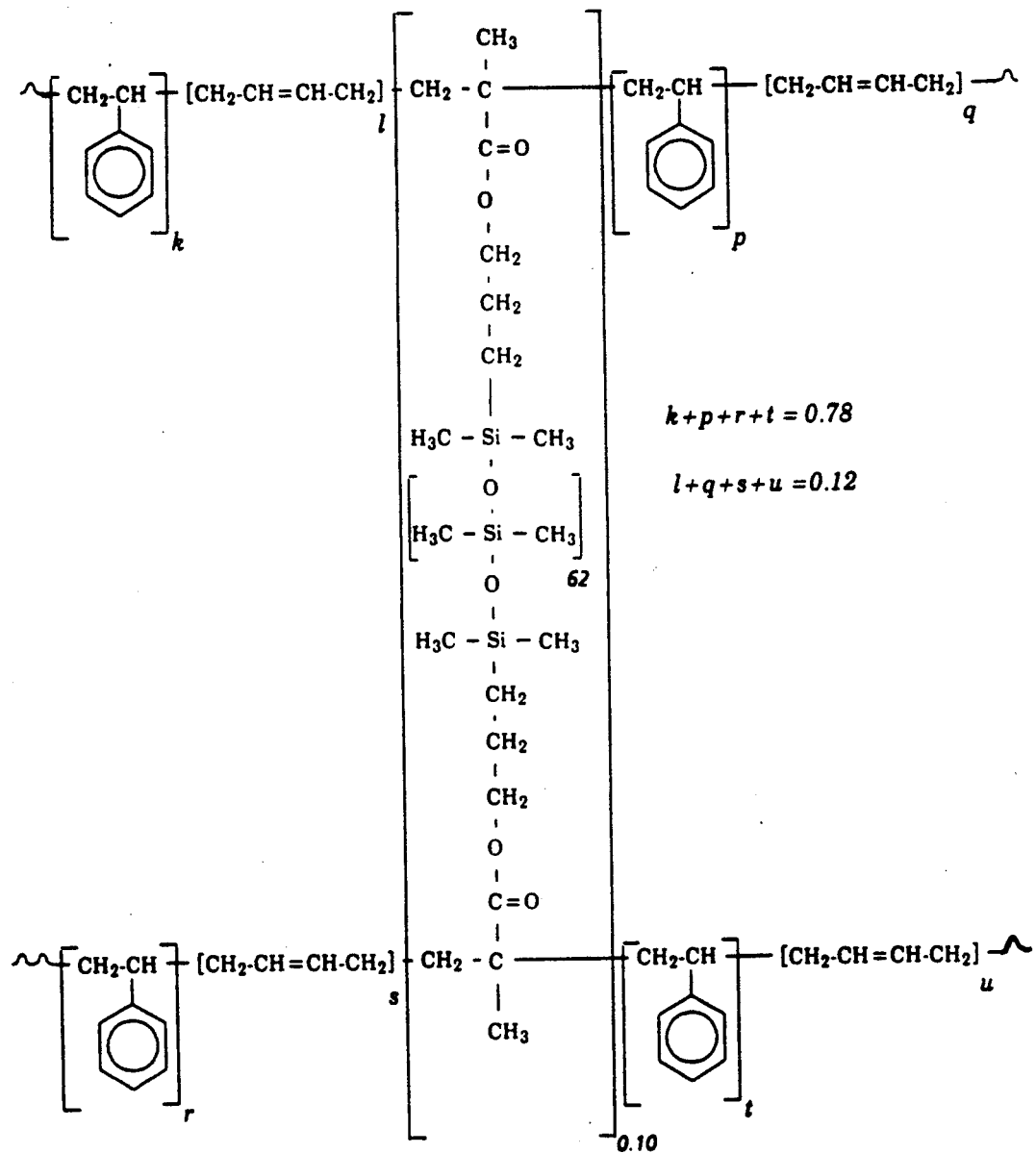
Figure 5:
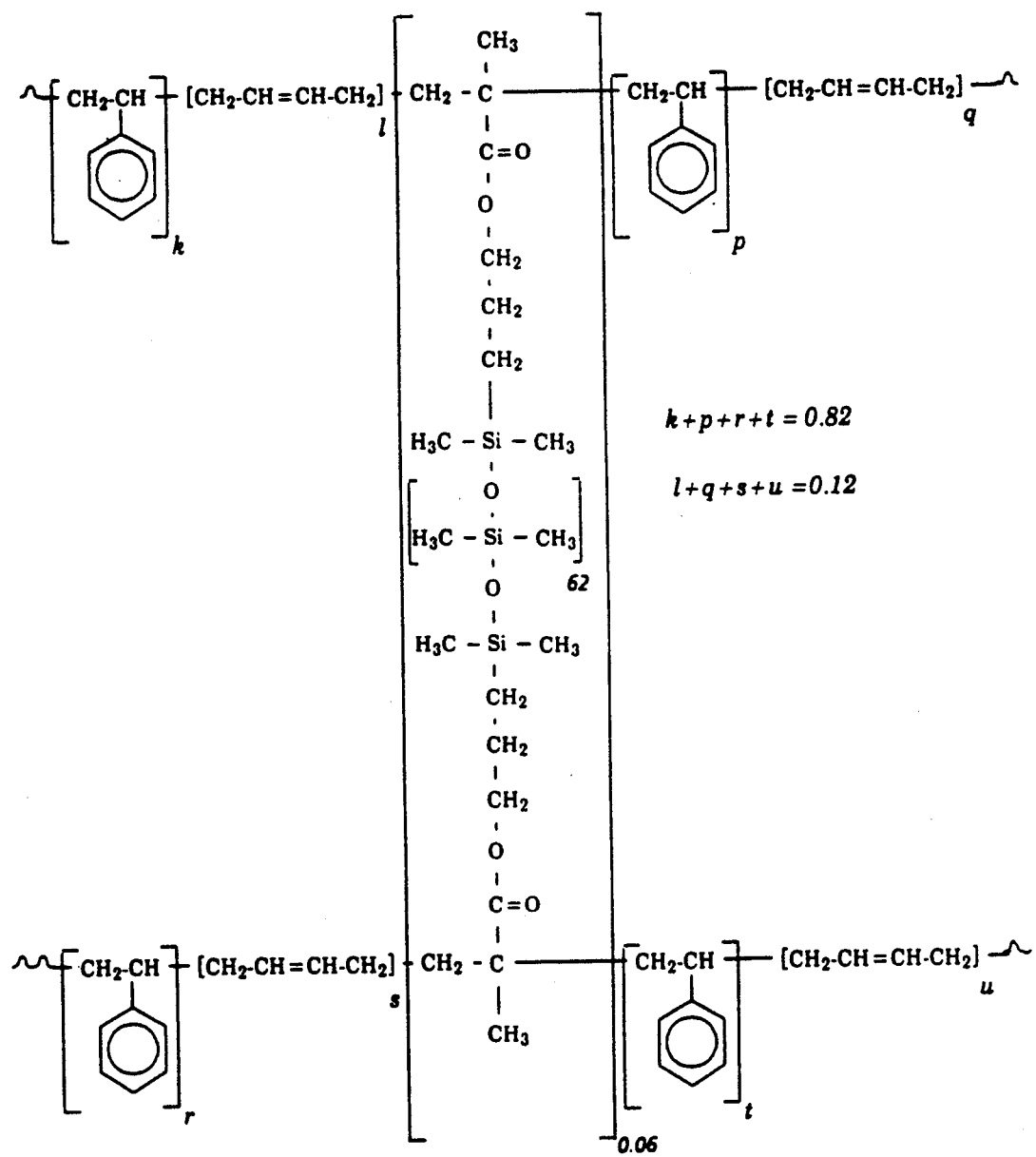

Specific illustrative examples of the crosslinked copolymers of the present invention are represented by the formulas of FIGS. 3 to 5, wherein in FIG. 3 the sum of k,p,r, and t is equal to 0.82, and the sum of l,q,s, and u is equal to 0.12; in FIG. 4, the sum of k,p,r, and t is equal to 0.78, and the sum of l,q,s, and u is equal to 0.12; and in FIG. 5, the sum of k,p,r, and t is equal to 0.82, and the sum of l,q,s, and u is equal to 0.12. In FIG. 2A, n is equal to 62; in FIG. 2B n is equal to 54, and in FIG. 2C n is equal to 200.

The compounds of FIG. 1 can be prepared by a suspension free radical process or emulsion polymerization by, for example, in one embodiment reacting styrene (weight fraction from about 0.35 to about 0.95), 1,3-butadiene (weight fraction from about 0.05 to about 0.20) and a $\omega,\omega'$difunctionalpolysiloxane (weight fraction from about 0.05 to about 0.5) in a modified Parr reactor, under a nitrogen pressure of between 30 and 80 psi, at an initial temperature of between 90° C. to 100° C., in the presence of a stabilizer, such as tricalcium phosphate, weight percent relative to the monomers of from about 2 percent to about 10 percent, a surfactant, such as Alkanol, weight percent relative to the monomers of from about 0.02 percent to about 0.5 percent, and two free radical initiators such as, for example, benzoyl peroxide, weight percent relative to the monomers of from about 1.0 percent to about 4 percent, and 0,0-t-butyl-O-(2-ethylhexyl) monoperoxycarbonate, weight percent relative to the monomers of from about 0.2 percent to about 0.8 percent. The reaction is usually conducted at between 90° C. and 100° C. for between 3 hours to 4.5 hours, followed by heating to between 115° C. and 130° C. for between 30 minutes and 90 minutes. After cooling, the desired product is washed with concentrated nitric acid, filtered, washed with deionized water two times and dried under vacuum at between 40° C. and 45° C.

With further respect to the present invention, the polydimethylsiloxane crosslinked copolymers can be generally prepared by suspension free radical polymerization processes or emulsion polymerizations as indicated herein. More specifically, in one specific embodiment these copolymer resins are prepared by the reaction of styrene (weight fraction amount of from about 0.35 to about 0.95), 1,3-butadiene (weight fraction amount of from about 0.05 to about 0.2), and $\omega,\omega'$-(3-methacryloylpropyl) polydimethylsiloxane (weight fraction amount of from about 0.05 to about 0.5) in the presence of Alkanol, tricalcium phosphate, benzoyl peroxide, and O,O-t-butyl-O-(2-ethylhexyl) monoperoxycarbonate. The reaction is usually conducted at 95° C. for 3.5 hours, followed by heating to 125° C. over a period of 40 minutes, and maintaining the reaction mixture at 125° C. for 1 hour. After cooling, the desired product is washed with concentrated nitric acid, filtered and rinsed with water. Subsequently, the polydimethylsiloxane crosslinked styrene/butadiene product is dried overnight at 40° C. under a vacuum. The product, which can be characterized by 80 MHz $^1$H NMR, melt index, glass transition, softening temperature, and GPC can be obtained in yields of from 95 percent to 98 percent with a purity as determined by percent ash residue of greater than 98 percent.

Figure 6:
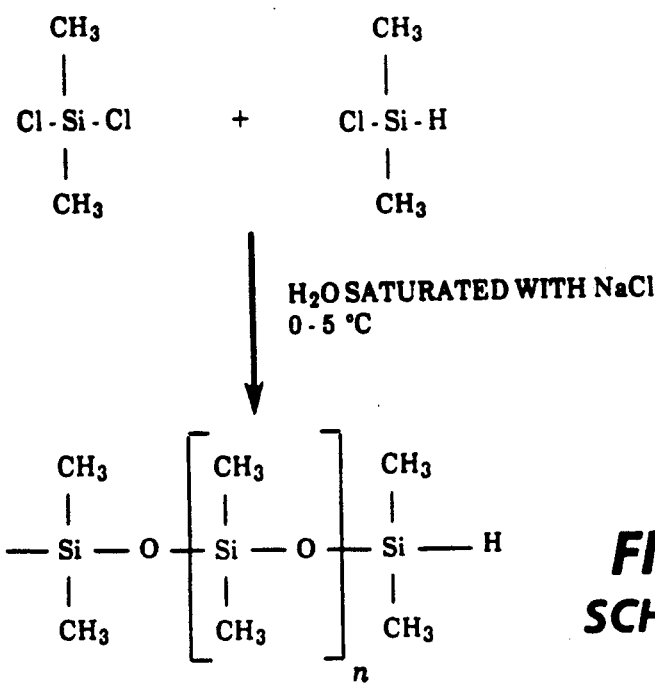
FIGS. 6 to 8 represent a reaction scheme for obtaining crosslinked polysiloxanes of the present invention.
Figure 7:
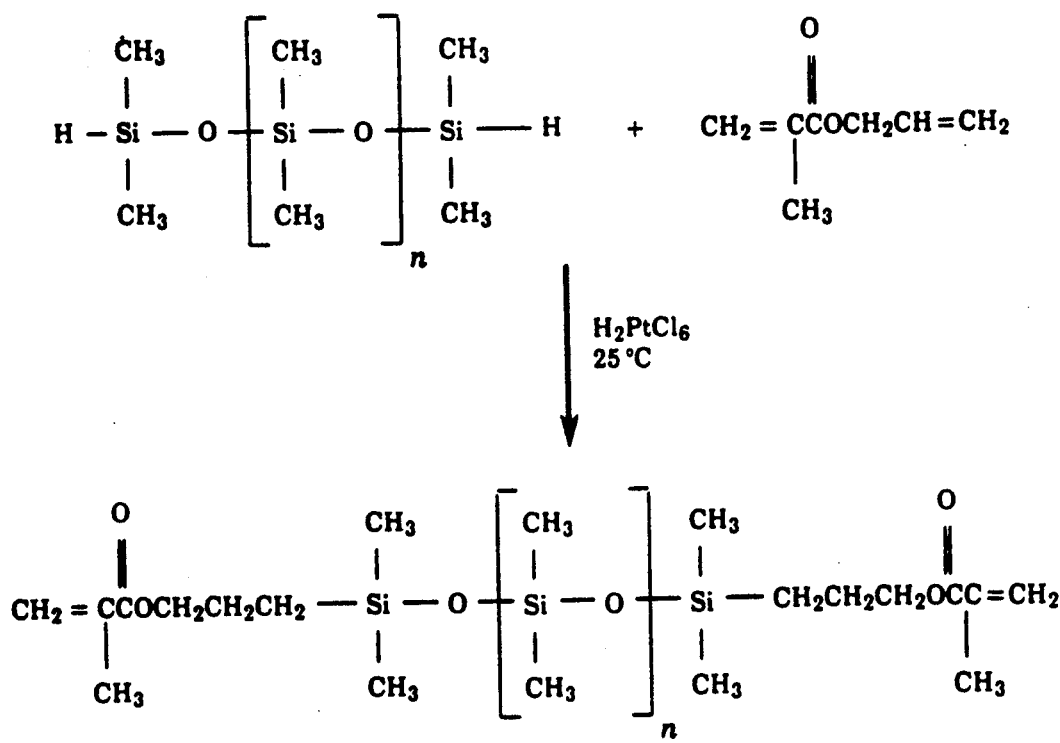
Figure 8:
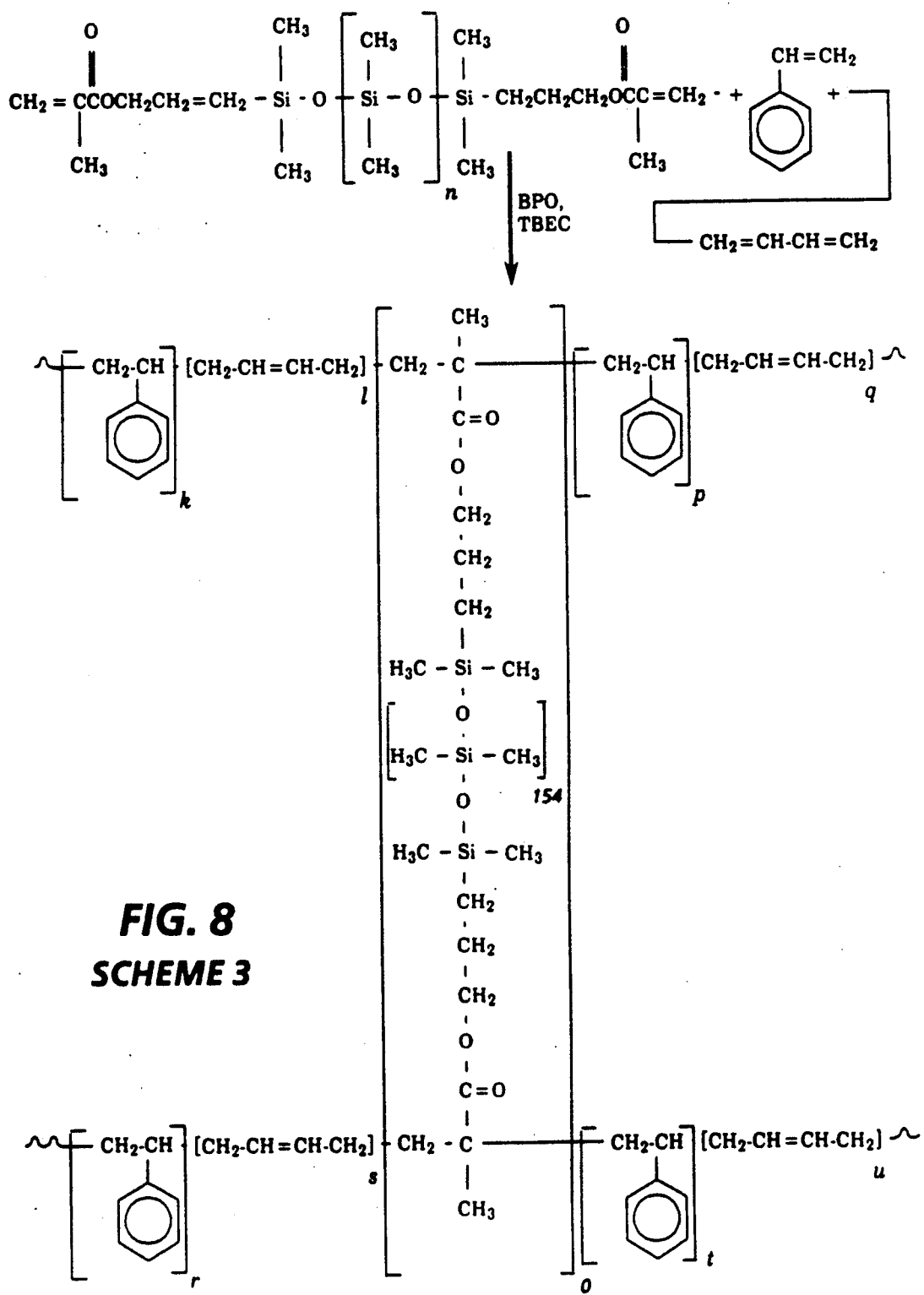

More specifically, the crosslinked polydialkylsiloxane copolymers of the present invention can be prepared in accordance with the reaction equations illustrated in FIGS. 6, 7, and 8, and reaction Schemes 1 to 3, wherein n is as indicated herein, that is a number of from about 10 to about 1,000. Specifically, Scheme 1 represents the synthesis of a $\omega,\omega'$-dihydridpolydimethylsiloxane macromer. Dichlorodimethylsilane, weight fraction of from about 96 percent to about 99.5 percent, is reacted with chlorodimethylsilane, weight fraction of from about 4 percent to about 0.5 percent, in a sodium chloride saturated water solution. The initial reaction temperature is usually between 0° C. and $-10°$ C. and is allowed to warm to between 0° C. and 10° C. as the reaction proceeds. Reaction times can be from about 2 hours to about 20 hours. The above monomer product is isolated by extraction with an organic solvent, such as halogenated aliphatic solvents, with methylene chloride being preferred. Purification of the crude product is performed by distilling off the cyclic siloxanes and low molecular siloxanes under vacuum at elevated temperatures usually between 80° C. and 120° C. The identity of the product, and its purity is usually determined by $^1$H NMR.

Scheme 2, FIG. 7, represents the synthesis of a $\omega,\omega'$-di-(3-methacryloylpropyl) polydimethylsiloxane macromer. In this reaction scheme, $\omega,\omega'$-dihydridopolydimethylsiloxane, weight fraction of about 99.5 percent to about 92 percent, is reacted with allyl methacrylate, weight fraction of about 7.5 percent to about 0.5 percent, in the presence of hydrogen hexachloroplatinate (IV) hydrate, weight fraction of about 0.4 percent to about 0.05 percent. The reaction may be accomplished in the presence of a small amount of an alcohol such as isopropyl alcohol (generally up to about 1 milliliter). The aforementioned allyl methacrylate is added to the $\omega,\omega'$-dihydridopolydimethylsiloxane, in the presence of the hydrogen hexachloroplatinate (IV) hydrate, via syringe at a rate that maintains the reaction temperature at between about 40° C. and about 65° C. The reaction mixture is cooled and stirred for up to an additional hour at about between 45° C. and 55° C. Subsequently, the above macromer product is precipitated in methanol. The immiscible oil that results is allowed to settle and the methanol is decanted off. The remaining oil is washed again with methanol, dissolved in an organic solvent such as methylene chloride, and filtered through a bed of Celite. The methylene chloride is evaporated to yield the product illustrated as characterized by $^1$H NMR.

Scheme 3, FIG. 8, represents the synthesis of a polydimethylsiloxane crosslinked styrene/butadiene copolymer product of the present invention wherein the letters such as I are as defined herein. The macromer, weight fraction of about 2 percent to about 50%, prepared in Scheme 2, with 1,3-butadiene, weight fraction of about 5 percent to about 20 percent and styrene, weight fraction of about 35 percent to about 94 percent, are reacted in the presence of benzoyl peroxide and O,O-t-butyl-O-(2-ethylhexyl)monoperoxycarbonate as initiators. The reactions are performed via suspension free radical process in which Alkanol is selected as a surfactant and tricalcium phosphate is used as a stabilizer. Generally, this reaction is performed at between about 90° C. and about 100° C. for between about 2 hours and about 5 hours after which the temperature is raised to between 115° C. and 130° C. for between 15 minutes and 2 hours. The reaction mixture is cooled and the resulting beads are washed with concentrated nitric acid and then with water. The product is dried and characterized by melting temperature (Tm), glass transition temperature (Tg), melt index (MI), gel permeation chromatography (GPC), and $^1$H NMR.

The aforementioned illustrated resins can be formulated into toner compositions, including colored toner compositions, by adding thereto or mixing therewith pigment particles such as carbon black, magnetites, cyan, magenta, yellow, red, green, blue, or mixtures thereof, and the like in an amount of from about 1 to about 20 percent by weight. Numerous well known suitable pigments or dyes can be selected as the colorant for the toner including, for example, carbon black, nigrosine dye, aniline blue, magnetites, and mixtures thereof. The pigment, which is preferably carbon black, should be present in a sufficient amount to render the toner composition highly colored thus enabling the formation of a clearly visible image on a suitable recording member. Generally, the pigment particles are present in amounts of from about 1 percent by weight to about 20 percent by weight based on the total weight of the toner composition, however, lesser or greater amounts of pigment components can be selected providing the objectives of the present invention are achieved. Magnetites are usually present in an amount of from about 10 to about 75 percent by weight.

The pigment particles can also be selected from cyan, magenta, yellow, blue, red, green, and other similar colored pigments, or mixtures thereof enabling the formation of colored developer compositions. These pigments are generally present in the toner compositions in an amount of from about 2 percent by weight to about 30 percent by weight. Illustrative examples of cyan, magenta and yellow pigments that can be selected include, for example, 2,9-dimethyl-substituted quinacridone, and anthraquinone dye identified in the Color Index as CI 60710, CI Dispersed Red 15; a diazo dye identified in the Color Index as CI 26050, CI Solvent Red 19; and the like. Illustrative examples of cyan materials that may be used as pigments include copper tetra-4-(octadecyl sulfonamido) phthalocyanine; X-copper phthalocyanine pigment listed in the Color Index as CI 74160; CI Pigment Blue; and Anthrathrene Blue, identified in the Color Index as CI 69810; Special Blue X-2137; and the like; while illustrative examples of yellow pigments that may be selected include diarylide yellow 3,3-dichlorobenzidene acetoacetanilides, a monoazo pigment identified in the Color Index as CI 12700; CI Solvent Yellow 16, a nitrophenyl amine sulfonamide identified in the Color Index as Foron Yellow SE/GLN; CI Dispersed Yellow 33, 2,5-dimethoxy-4-sulfonanilide phenylazo-4'-chloro-2,5-dimethoxy acetoacetanilide; Permanent Yellow FGL; and other similar compositions.

Illustrative examples of carrier particles that can be selected for mixing with the toner of the present invention, thus enabling developer compositions, include those particles that are capable of triboelectrically obtaining a charge of opposite polarity to that of the toner particles. Accordingly, the carrier particles of the present invention can be selected to be of a negative polarity allowing the toner particles which are positively charged to adhere to and surround the carrier particles. Illustrative examples of carrier particles include methyl methacrylate, iron, glass, steel, nickel, iron ferrites, copper zinc ferrites, and the like. Additionally, there can be selected as carrier particles nickel berry carriers as disclosed in U.S. Pat. No. 3,847,604, the disclosure of which is totally incorporated herein by reference, which carriers are comprised of nodular carrier beads of nickel characterized by surfaces of reoccurring recesses and protrusions thereby providing particles with a relatively large external area. The selected carrier particles can be used with or without a coating, the coating generally being comprised of fluoropolymers, such as polyvinylidene fluoride resins, copolymers of styrene, methylmethacrylate, and a silane, such as vinyl triethoxysilane, tetrafluoroethylenes, copolymers available as FP 461, U.S. Ser. No. 751,922 (now abandoned) with a filing date of July 5, 1985. Also, the carrier cores and coatings as illustrated in U.S. Pat. Nos. 4,935,326 and 4,937,166, the disclosures of which are totally incorporated herein by reference, other known coatings, and the like can be selected. Coating weights of from about 0.1 to about 5, and preferably from about 1 to about 3 weight percent can be selected, however, other weights may be utilized providing the objectives of the present invention are achieved.

The diameter of the carrier particles, which can vary, is generally from about 50 microns to about 1,000 microns, thus allowing these particles to possess sufficient density and inertia to avoid adherence to the electrostatic images during the development process. The carrier particles can be mixed with the toner composition in various suitable combinations, however, best results are obtained when about 1 part to about 10 parts toner to about 200 parts by weight of carrier are combined.

Also, the toner compositions of the present invention can be prepared by a number of known methods including melt blending the toner resin particles containing the pigment particles followed by mechanical attrition. Other methods include those well known in the art such as spray drying, melt dispersion, dispersion polymerizations, suspension polymerizations, and extrusion processes.

The toner and developer compositions of the present invention may be selected for developing images in electrophotographic imaging systems containing therein conventional photoreceptors, such as selenium, and selenium alloys. Illustrative examples of layered photoresponsive devices which can be selected include those comprised of transport layers and photogenerating layers, reference U.S. Pat. No. 4,265,990, the disclosure of which is totally incorporated herein by reference. Examples of generating layers include trigonal selenium, metal phthalocyanines, metal free phthalocyanines, squaraine pigments and vanadyl phthalocyanines, while examples of charge transport layers include the aryl amines as disclosed in U.S. Pat. No. 4,265,990. With layered imaging members, there are usually included in the toner compositions charge enhancing additives as indicated herein such as alkyl pyridinium halides, organic sulfates, distearyl dimethyl ammonium methyl sulfate, and the like. These additives, which are usually present in an amount of from about 0.1 percent to about 10 percent by weight, and preferably from about 1 to about 5 weight percent are selected since the layered imaging members are usually negatively charged, thus positively charged toner compositions are preferred. Negatively charged toner compositions of the present invention usually contain in an amount of from about 1 to about 10 weight percent, for example, charge additives such as TRH available from Hodogaya, orthophenylcarboxylic acids, and the like.

Furthermore, the toner compositions of the present invention can have incorporated therein optional additives, such as colloidal silicas, metal salts of fatty acids, and metal salts, such as zinc stearate, which additives are usually present in an amount of from about 0.1 to about 5 percent by weight; reference U.S. Pat. Nos. 3,590,000; 3,983,045 and 3,900,588, the disclosures of which are totally incorporated herein by reference.

In one specific embodiment of the present invention, toner compositions can be prepared by admixing the polydialkylsiloxane or polydiarylsiloxane (or mixtures thereof) crosslinked styrene/butadiene copolymers represented by the formulas of FIGS. 1, and 3 to 5, 88 percent by weight, with 10 percent by weight of carbon black particles, and 2 percent by weight of the charge enhancing additive distearyl dimethyl ammonium methyl sulfate. The aforementioned toner composition, 3 parts by weight, can then be admixed with carrier particles, 100 parts by weight, comprised of a core of ferrite with a coating thereover of a styrene methyl methacrylate organo triethoxysilane terpolymer, 1.25 weight percent. This developer can be selected for incorporation into a xerographic imaging apparatus test fixture such as the Model D, or the Xerox Corporation 1075 TM test fixture, which includes therein a negatively charged layered photoresponsive imaging member, reference U.S. Pat. No. 4,265,990, the disclosure of which is totally incorporated herein by reference, and no fuser oil. It is believed that images of excellent resolution with substantially no background depositions will result subsequent to development of the latent images, transfer to a paper substrate, and fixing by heat. Also, it is believed that the aforementioned toner will have a measured blocking temperature of 125° F., a minimum fix temperature of 325° F. ±5° F., a hot offset temperature of from about 380° F. to 390° F., and a triboelectric charge thereon of a positive 25 microcoulombs per gram as determined by the known Faraday Cage method. Generally, the triboelectric charge on the toner of the present invention can be from a positive or negative 10 to about 40, and preferably 15 to about 30 microcoulombs per gram.

The aforementioned imaging member in one embodiment can be comprised of an aluminum supporting substrate, a photogenerating layer of trigonal selenium, and a charge transport layer containing 55 percent by weight of N,N'-diphenyl-N,N'-bis(3-methylphenyl)-1,1'-biphenyl-4,4'-diamine dispersed in 45 percent by weight of a polycarbonate available as Makrolon.

The following examples are being supplied to further define various species of the present invention, it being noted that these examples are intended to illustrate and not to limit the scope of the present invention. Parts and percentages are by weight unless otherwise indicated.

EXAMPLE I

Synthesis of ω,ω'-Dihydridopolydimethylsiloxane Macromer

A solution of dichlorodimethylsilane, 29.7 g (grams), 0.23 moles, and chlorodimethylsilane (0.33 g, 0.0035 moles) was added dropwise to a vigorously stirring saturated sodium chloride solution (150 milliliters), cooled in an ice/salt water bath maintained at a temperature of from about $-3°$ C. to about $-6°$ C. The reaction was allowed to continue at about 5° C. for approximately 20 hours. The polydimethylsiloxane macromer formed was extracted with methylene chloride (three times for a total of approximately 600 milliliters of methylene chloride). The resulting solution was dried over sodium sulfate and the methylene chloride evaporated to yield 108.0 g (93.8 percent yield) of a crude polydimethylsiloxane macromer. The low molecular weight siloxanes and cyclic siloxanes were removed from the formed macromonomer under vacuum (0.25 Torr) at 100° C. resulting in a clear viscous oil of the above high molecular weight siloxane product. Yield of the resulting product ω,ω'-dihydridopolydimethylsiloxane was 10 g (FIG. 2A) Mn 6,793; Mw 11,614. $^1$H NMR (80 MHz) CDCl$_3$ δ0.05, s, SiCH$_3$; 4.6 to 4.8, m, SiH.

EXAMPLE II

Synthesis of a ω,ω'-di-[3-methacryloylpropyl]polydimethylsiloxane Macromer

To a three neck flask equipped with a reflux condenser, a septum and a thermometer was added the disilane terminated polydimethylsiloxane (10 g) of Example I. Hydrogen hexachloroplatinate (IV) hydrate (13 milligrams in approximately 2 drops of isopropanol) was then added to the flask and the reaction mixture was heated with an oil bath to 50° C. Allyl methacrylate (0.315 g) was added slowly, via syringe, to the flask over a period of 30 minutes while the temperature was monitored and not allowed to go above 65° C. The reaction mixture was cooled to room temperature and stirred for 1 hour after which it was poured into an excess of methanol. The immiscible oil that resulted was allowed to settle and the methanol was decanted off. The remaining oil was washed again with methanol, dissolved in methylene chloride (about 25 milliliters) and filtered through a bed of Celite. The methylene chloride was evaporated off and the above desired pale yellow oil product was dried under vacuum for 2 hours. $^1$H NMR (80 MHz) CDCl$_3$ δ0.05, s, SiCH$_3$; 0.99 to 1.5, m, CH$_2$CH$_2$; 1.95, bs, CH$_3$; 3.9 to 4.2, t, OCH$_2$; 5.5, bs, =CH; 6.08, bs, =CH. GPC, Mw=11,614. (FIG. 2B).

EXAMPLE III

Synthesis of a ω,ω'-di-[3-methacryloylpropyl]polydimethylsiloxane Macromer

When the procedures of Examples I and II were repeated with 29.3 g (0.23 moles) of dimethyldichlorosilane and 0.64 g (0.0068 moles) of chlorodimethylsilane followed by the addition of 0.72 milliliter (0.0054 moles) of allyl methacrylate in the presence of 13 milligrams of hydrogen hexachloroplatinate (IV) hydrate, the above ω,ω'-di-[3-methacryloylpropyl]polydimethylsiloxane was obtained in 80 percent yield. $^1$H NMR (80 MHz) CDCl$_3$ δ0.05, s, SiCH$_3$; 0.99 to 1.5, m, CH$_2$CH$_2$, 1.95, bs, CH$_3$; 3.9 to 4.2, t, OCH$_2$; 5.5, bs, =CH2 6.08, bs, =CH$_4$. GPC, Mw=5474. (FIG. 2A).

EXAMPLE IV

Synthesis of a ω,ω'-di-[3-methacryloylpropyl]polydimethylsiloxane Macromer

When the procedures of Examples I and II were repeated with 29.8 g (0.23 moles) of dimethyldichlorosilane and 0.22 g (0.0023 moles) of chlorodimethylsilane, a dihydrido terminated polydimethylsiloxane macromer was obtained. The reaction of this macromer (10 g) with allyl methyacrylate (0.24 milliliter, 0.0018 moles) in the presence of hydrogen hexachloroplatinate (IV) hydrate (13 mg) yielded a ω,ω'-di-[3-methacryloylpropyl]-polydimethylsiloxane with a molecular weight average of approximately 15,000 in 78 percent yield. (FIG. 2C).

EXAMPLE V

Synthesis of a Polydimethylsiloxane Crosslinked Styrene/Butadiene Ternary Copolymer, 6 percent by Weight of the Polydimethylsiloxane Macromer of Example I Tricalcium phosphate (4.0 g) suspended in a solution of Alkanol (48 milligrams) in distilled water (30 milliliters) was added to 70 milliliters of distilled water in a modified stainless steel 150 milliliter Parr bomb. The reactor was sealed and heated to 95° C. over a period of 40 minutes. During the heating period, the reactor was flushed with nitrogen gas.

A solution of styrene (67.1 g, 0.65 moles), ω,ω'-di[3-methacryloylpropyl]polydimethylsiloxane (4.9 g), obtained by the process of Example I, benzoyl peroxide (2.24 g, 0.0093 moles) and O,O-t-butyl-O-(2-ethylhexyl)monoperoxycarbonate (0.27 milliliter) was added to a 150 milliliter stainless steel cylinder. To the resulting solution was added 1,3-butadiene (10.0 g, 0.185 moles) freshly distilled into a second stainless steel cylinder. The addition was made by connecting the aforementioned two 150 milliliter stainless steel cylinders together and opening their respective valves thus allowing the 1,3-butadiene to flow from its cylinder. The valves were closed and the cylinders were shaken for approximately 15 seconds. This procedure was repeated 8 to 10 times to ensure complete transfer of 1,3-butadiene.

When the temperature of the aqueous mixture in the reactor reached 95° C., the monomers, prepared above, were added, via a sparge tube over a 10 to 20 minute time period by the application of a nitrogen pressure (up to a maximum of 80 psi). The reaction was allowed to continue for 192 minutes and was then purged of excess butadiene by flushing the reactor with nitrogen five times over a period of ten minutes.

The reactor temperature was then increased from 95° C. to 125° C. over 40 minutes, maintained at 125° C. over one hour and then cooled to room temperature over a period of 45 minutes. The reactor was opened and the product in water was transferred to a 250 milliliter beaker. Concentrated nitric acid (10 milliliters) was added and the resulting suspension was stirred for 10 minutes. The water was filtered off and the polymer beads were washed two to three times with 250 milliliters of deionized water each time.

The polymer product, polydimethylsiloxane crosslinked styrene/butadiene copolymer, was dried over night under vacuum at 40° C.

The product, which contained 6 percent by weight of the polydimethylsiloxane macromer of Example I, was characterized by $^1$H NMR, 80 MHz (CDCl$_3$) δ0.15, bs, SiCH$_3$; δ1.0 to 2.5, m, CH$_2$; δ4.75 to 5.25, bs, vinylic; δ6.5 to 7.5, bm, aromatic. GPC, Mn 18,100, Mw 149,070, P.D. 8.2; Tg 56° C.; m.p. −40.5° C.; Ml 17.2 gm/10 minutes. (FIG. 3).

EXAMPLE VI

Synthesis of a Polydimethylsiloxane Crosslined Styrene/Butadiene Ternary Copolymer, 10 percent by Weight of the Polydimethylsiloxane Macromer of Example III When Example V was repeated with the exceptions that the amounts of reactants indicated were selected: 29 milligrams of Alkanol, 2.4 g of tricalcium phosphate, 1.4 g of benzoyl peroxide, 0.17 milliliter of O,O-t-butyl-O-(2-ethylhexyl) monoperoxycarbonate, 39.2 g of styrene, 5.8 g of 1,3-butadiene and 5.0 g of a the macromer of ω,ω'-[3-dimethacryloylpropyl]polydimethylsiloxane of Example III in 100 milliliters of water, a polydimethylsiloxane crosslinked styrene/butadiene ternary copolymer (FIG. 4) was obtained. NMR same as the polymer of Example V; Tg 55° C.; m.p. −40° C.; Ml 9.31 gm/10 minutes.

EXAMPLE VII

Synthesis of a Polydimethylsiloxane Crosslinked Styrene/Butadiene Ternary Copolymer, 6 percent by weight of the Polydimethylsiloxane Macromer of Example III When Example V was repeated with 22 milligrams of Alkanol, 1.8 g of tricalcium phosphate, 1.0 g of benzoyl peroxide, 0.13 milliliters of O,O-t-butyl-O-(2-ethylhexyl)monoperoxycarbonate, 31.0 g of styrene, 4.6 g of 1,3-butadiene and 2.3 g of the polydimethylsiloxane of Example III in 100 milliliters of water, a ω,ω'-[3-dimethacryloylpropyl]polydimethylsiloxane crosslinked styrene/butadiene ternary copolymer (FIG. 5) was obtained. NMR same as the polymer of Example V; GPC, Mn 18,610; Mw 150,178; P.D. 8.1; Ml 14.8 gm/10 minutes.

EXAMPLE VIII

Modified Procedure for the Synthesis of Di(methyacrylate) Terminated Polydimethylsiloxane Chlorodimethylsilane (approximately 0.5 milliliter) was added to hydrogen hexachloroplatinate (IV) hydrate (23 milligrams, 40 percent Pt) in a 15 milliliter round bottom three-necked flask equipped with a septum, drying tube and thermometer. The evolution of hydrogen gas started immediately and the reaction was allowed to continue until hydrogen gas was no longer produced, at which time the catalyst hydrogen hexachloroplatinate (IV) hydrate was completely in solution. The excess chlorodimethylsilane was removed with a stream of air to yield a paste in the bottom of the flask. Allyl methacrylate (0.24 milliliter, 0.0052 moles) was added to the activated catalyst to yield a clear, light brown solution. The resulting solution was heated to about 49° to 53° C. after which the disilane terminate polydimethylsiloxane (7.0 g) was added dropwise, via syringe, at a rate such that the temperature of the reaction mixture did not exceed 53° C. After complete addition of the polydimethylsiloxane, the reaction mixture was stirred for an additional one hour.

The reaction mixture was added dropwise to methanol (200 milliliters). The resulting oil was allowed to settle and the methanol was decanted off. This procedure was repeated two more times. The purified hydrosilylated polydimethylsiloxane was dissolved in methylene chloride and allowed to remain exposed to the air for 1 hour. The black precipitate (catalyst) that formed was removed by filtration through a bed of Celite. The methylene chloride was evaporated yielding a light brown viscous oil (4.4 g, 60 percent yield). The product di(methylacrylate) terminated polydimethylsiloxane, reference Scheme 2 (FIG. 7), was characterized by $^1$H NMR, 80 MHz (CDCl$_3$), δ0.05, s, Si—CH$_3$; δ0.83 to 1.91, m, —CH2—; δ3.99 to 4.21, t, —OCH2—; δ5.5, bs, vinylic; δ6.08, bs, vinylic. GPC, Mw 11,614; P.D. 1.71.

Toner compositions can be prepared by admixing the aforementioned prepared crosslinked polydimethylsiloxane polymers with pigment particles, and optional additives as illustrated herein. One preferred toner composition can be prepared by melt mixing and blending in a Banbury Mill 88 weight percent of 8 weight percent of carbon black and 2 weight percent of distearyl dimethyl ammonium methyl sulfate. Thereafter, jetting and classification is accomplished which can provide toner particles with an average volume diameter of 10 to 11 microns, and with a tribo charge of +25 microcoulombs per gram.

Other modifications of the present invention may occur to those skilled in the art subsequent to a review of the present application. The aforementioned modifications, including equivalents thereof, are intended to be included within the scope of the present invention.

-continued
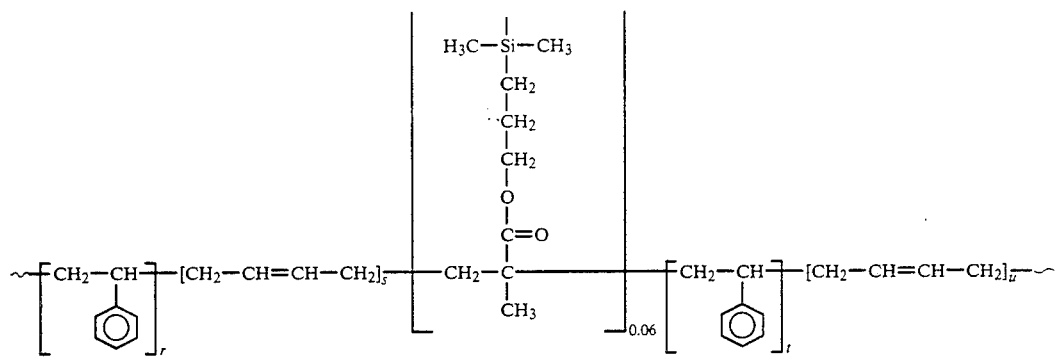

What is claimed is:

1. A crosslinked polysiloxane styrene/butadiene copolymer represented by the following formula

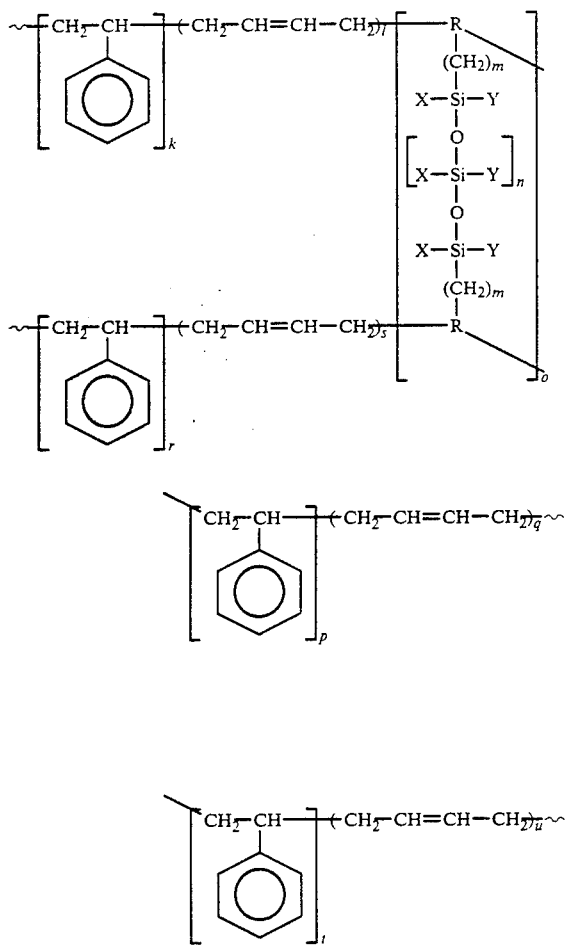

wherein m is a number of from about 2 to about 10; n is a number of from about 10 to about 1,000; k, l, o, p, q, r, s, t, u are weight fraction numbers totaling one with the sum of $k+p+r+t$ being from about 0.35 to about 0.94; the sum of $l+q+s+u$ being from about 0.05 to about 0.2 and o is from about 0.02 to about 0.5; R is $CH_2C(R')$ or alkylene-$CR''C(O)O$, where R' is an aromatic or a substituted aromatic substituent and R'' is hydrogen or an alkyl substituent, and X is aryl, substituted aryl or alkyl, and Y is aryl, substituted aryl or alkyl.

2. A polysiloxane crosslinked copolymer in accordance with claim 1 wherein R' is an aromatic substituent of from about 6 to about 24 carbon atoms.

3. A polysiloxane crosslinked copolymer in accordance with claim 1 wherein R is a carboxylate substituent of from about 3 to about 10 carbons.

4. A polysiloxane crosslinked copolymer in accordance with claim 1 wherein alkyl for alkyl-$CR''C(O)O$ and for the R'' alkyl is from 1 to about 25 carbon atoms.

5. A polysiloxane crosslinked copolymer in accordance with claim 1 wherein R'' is alkyl of from 1 to about 20 carbon atoms.

6. A polysiloxane crosslinked copolymer in accordance with claim 5 wherein the alkyl substituent R'' contains from about 1 to about 10 carbon atoms.

7. A polysiloxane crosslinked copolymer in accordance with claim 6 wherein the alkyl substituent R'' is selected from the group consisting of methyl, ethyl, propyl, butyl, pentyl, hexyl, heptyl, octyl, nonyl and decyl.

8. A polysiloxane crosslinked copolymer in accordance with claim 1 which X and Y are aryl, substituted aryl or alkyl.

9. A polysiloxane crosslinked copolymer in accordance with claim 1 wherein the weight average molecular weight of the crosslinked copolymer is from about 90,000 to about 300,000.

10. A crosslinked polysiloxane in accordance with claim 1 that is prepared by a suspension free radical polymerization.

11. The polydimethylsiloxane crosslinked styrene/butadiene copolymer represented by the following formulas

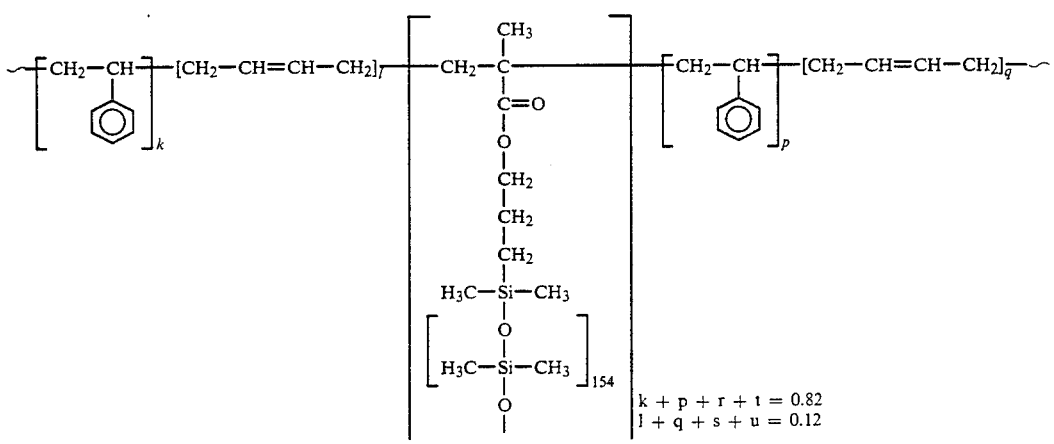

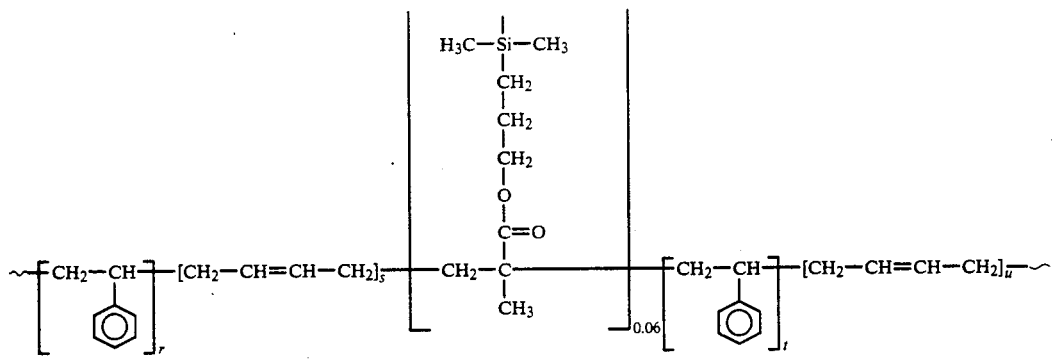
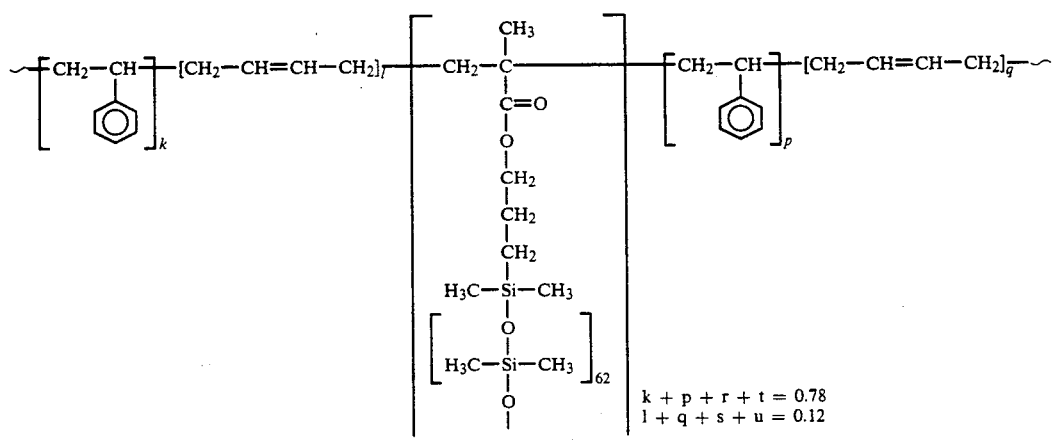
k + p + r + t = 0.78
l + q + s + u = 0.12
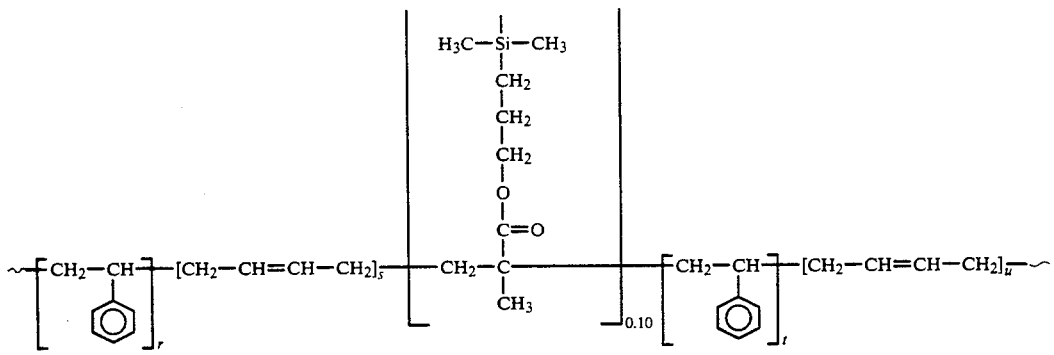
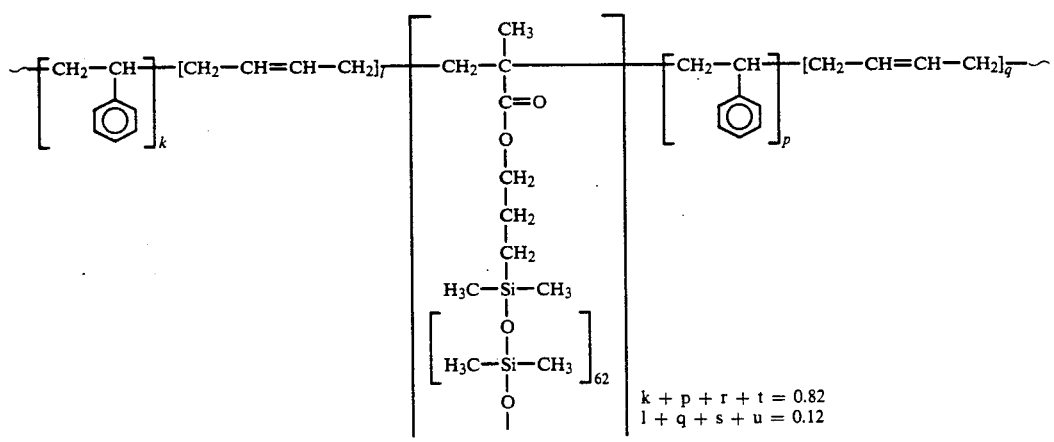
k + p + r + t = 0.82
l + q + s + u = 0.12